United States Patent Office 3,102,743
Patented Sept. 3, 1963

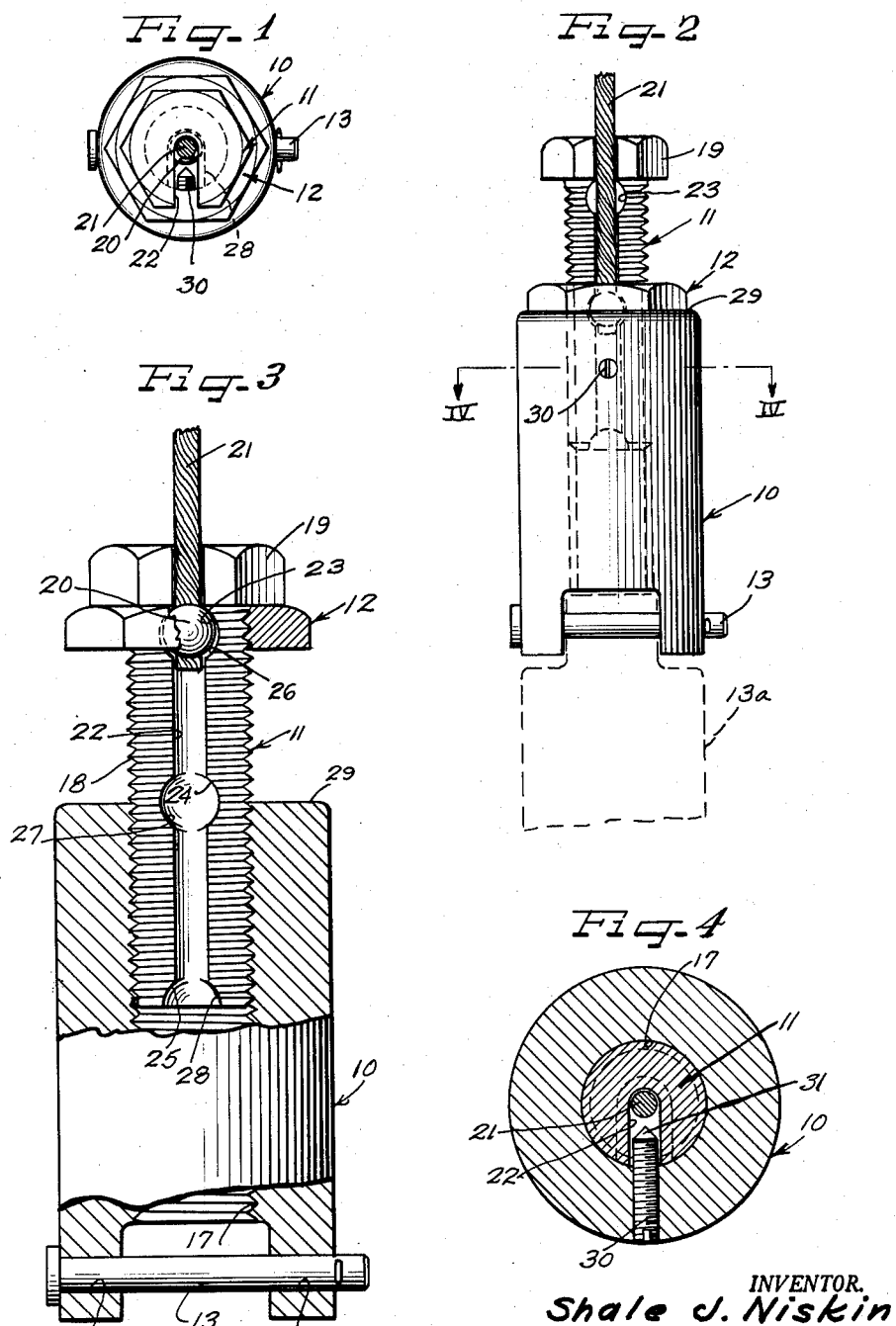

3,102,743
TURNBUCKLE
Shale J. Niskin, Miami, Fla., assignor to
Stevenson P. Clark, Coconut Grove, Fla.
Filed May 4, 1961, Ser. No. 107,692
4 Claims. (Cl. 287—59)

The present invention relates to an improved adjustable length connector of the type for connecting to lines or connecting a line to a support when the length of the connection is to be extended or shortened. This type of mechanism is frequently referred to as a turnbuckle.

In many applications it is advantageous for a turnbuckle to have a wide range of adjustment. It is also advantageous to reduce the length of threading of the members both from the standpoint of manufacturing cost and from the standpoint of maintenance and reducing damage or fouling of the threads during use. It is also advantageous that the turnbuckles be as short as possible to reduce the possibility of their being bent or broken and to make them less cumbersome and of lighter weight.

It is accordingly an object of the present invention to provide an improved turnbuckle wherein adjustments in length are easily and rapidly made.

A further object of the invention is to provide an improved turnbuckle wherein rapid change in length adjustments can be made over a broad range and wherein small adjustments can also be made, with the broad adjustments saving time for adjustment and reducing the size and length of parts that are necessary.

A still further object of the invention is to provide an improved lightweight compact inexpensive turnbuckle well suited for use on sailing vessels and also suited for various other environments of use.

A still further object of the invention is to provide an improved turnbuckle wherein a cable can be easily and rapidly attached and locked in connected position, and wherein the adjusted position of the turnbuckle can be easily locked or unlocked.

Other objects and advantages will become more apparent with the teaching of the principles of the invention in connection with the disclosure of the preferred embodiments in the specification, claims and drawings, in which:

FIGURE 1 is a top plan view of a turnbuckle constructed in accordance with the principles of the present invention;

FIGURE 2 is a side elevational view of the turnbuckle;

FIGURE 3 is an enlarged side elevational view shown partially in section of the turnbuckle; and FIGURE 4 is a horizontal sectional view taken substantially along line IV—IV of FIGURE 2.

As shown on the drawings:

A cylindrical metal body forms a first connector member 10 and is adjustably connected to a cylindrical second connector member 11 to which is threaded a lock nut 12. The cylindrical body or first connector member 10 is adapted for connecting to anchoring element as shown for example by the broken line element 13a, and for this purpose a cross clevis pin 13 extends through holes 15 and 16 in side portions of the lower end of the first connector member 10.

The first connector member 10 has an axially extending bore with threads 17 to receive the telescoping second connector member 11 which has external threads 18 so as to provide for fine adjustment of the length of the mechanism. At the upper end of the second telescoping connector member 11 is a head 19 with flat sides for receiving a wrench or pliers to adjust the threaded position of the second connector member 11.

The second connector member 11 receives a line or cable 21 having an anchoring sphere 20 secured at its end.

The telescoping second connector member 11 has a radially opening axially extending slot 22 which extends for its full length so that the line 21 may be slid into the side of the connector member 11. To secure the line 21 to the second connector member 11 and to provide for rapid broad adjustment of the location where the line is connected, a plurality of connector means are provided along the second connector member 11 in the form of axially spaced fragmentary spherical seats 23, 24 and 25. These seats face downwardly toward the first connector member 10 for receiving the sphere 20, and are enlarged from the slot 22 at the center of the second connector member 11. This permits the second connector member 11 to be turned for adjustment without twisting the line 21.

For easily and rapidly disconnecting the line 21 from the second connector member 11, and for attaching the line at a new location, radially extending cylindrical bores are cut into the slot 22 each leading to a spherical seat, with the bores shown at 26, 27 and 28 for the respective seats 23, 24 and 25. The bores form passages leading to these seats and may be manufactured by being cast into the connector member 11 or may be simply manufactured by radially drilling into the slot 22. The bore 28 will open from the bottom of the member 11 and may be omitted. Each of the seats 23, 24 and 25 is preferably raised from the bore leading to it, so that the sphere will tend to stay in the seat and not slide laterally into the bore.

The lock nut 12 may be turned down against the upper end 29 of the body of the first connector member 10 to lock the adjusted position of the second connector member 11. If desired, the nut 12 may be brought up against the lower surface of the head 19 when the sphere 20 is in the uppermost seat 23, as shown in FIGURE 3, and this will help lock the line in place preventing the ball from being drawn out through the bore 26. With the sphere 20 in either of the other seats 24 or 25, when the second connector member 11 is turned down into the first connector member 10 in positions such as that shown in FIGURE 2, the body of the first connector member 10 will prevent withdrawal of the sphere 20.

The second connector member 11 may be non-rotatably locked in its adjusted position by a radially extending threaded locking pin 30, FIGURES 1, 2 and 4. The locking pin 30 is backed out of its threaded opening so that it will be out of the slot 22 when the connector member 11 is adjustably rotated. When the adjusted position is reached, the connector member 11 is merely turned a portion of a turn so that the slot 22 is aligned with the pin 30 and the pin is then turned into the slot. The pin may be provided with a tapered end 31 so as to be partially self-aligning and prevent damaging the threads 18 in the event the slot 22 is not in exact alignment with the pin 30.

In operation, the first connector member 10 is suitably connected to an anchor such as 13a by the pin 13, FIGURE 2, and the lock nut 12 is run down on the second connector member 11 to be out of the way of the slot 22. The sphere 20 at the end of the line 21 is then slid laterally into the desired fragmentary spherical seat 23, 24 or 25, and the connector member 11 is turned into the first connector member 10 for the desired length. The lock nut 12 may be turned up against the head 19 for holding the sphere in its socket if the end socket is chosen, as shown in FIGURE 3, or it may be turned down to locking position as shown in FIGURE 2. The connector member 11 is locked in its rotated position by turning in the pin 30.

Thus it will be seen that I have provided an improved turnbuckle mechanism which meets the objectives and provides the advantages above set forth.

The assembly has few parts, and is inexpensive to manufacture and is reliable in operation. Rapid adjustment of the length can be made by selection of the sockets and fine adjustment can be made by rotation of the second connector.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A turnbuckle mechanism comprising:
   a cylindrical connector member having
   an axially extending notch at the base thereof and forming legs,
   said legs formed with radial holes,
   an internally axially extending threaded bore formed in said cylindrical connector,
   a clevis pin extending through said radial holes for anchoring said cylindrical connector to an anchoring member,
   an externally threaded telescoping second connector member threaded into the cylindrical connector threaded bore,
   a radially opening axially extending slot formed in said second connector for accommodating a line having a spherical end,
   said slot extending the entire length of said connector and extending through the center thereof,
   a plurality of fragmentary spherical seats formed in the center of said slot and at axially spaced locations in said slot,
   said seats facing towards the cylindrical connector for seating the spherical end of said line,
   cylindrical radially extending passages enlarged in said slot leading to each of the seats,
   an enlarged wrench receiving head formed on the end of said second connector extending axially away from said cylindrical connector,
   said head being used to axially move the second connector relative to the cylindrical connector,
   and a lock nut threaded on said second connector holding the line in said slot and for locking the second connector
   whereby the line may be tightened and loosened by moving the spherical line end to another fragmentary seat and rotating the second connector relative to the cylindrical connector.

2. A turnbuckle mechanism comprising:
   a cylindrical connector member having
   an axially extending notch at the base thereof and forming legs,
   said legs formed with radial holes,
   an internally axially extending threaded bore formed in said cylindrical connector,
   a clevis pin extending through said radial holes for anchoring said cylindrical connector to an anchoring member,
   an externally threaded telescoping second connector member threaded into the cylindrical connector threaded bore,
   a radially opening axially extending slot defined by said second connector for accommodating a line having a spherical end,
   said slot extending the entire length of said connector and extending through the center thereof,
   a plurality of fragmentary spherical seats formed in the center of said slot and at axially spaced locations in said slot,
   said seats facing towards the cylindrical connector for seating the spherical end of said line,
   cylindrical radially extending passages enlarged in said slot leading to each of the seats,
   an enlarged wrench receiving head formed on the end of said second connector extending axially away from said cylindrical connector,
   said head being used to axially move the second connector relative to the cylindrical connector,
   a radially extending locking screw threaded into the cylindrical connector for entering the slot of the second connector and prevent relative rotation of the second connector and the cylindrical connector,
   and a lock nut threaded on said second connector holding the line in said slot and for locking the second connector
   whereby the line may be tightened and loosened by moving the spherical line end to another fragmentary seat and rotating the second connector relative to the cylindrical connector.

3. A turnbuckle mechanism comprising:
   a first connector member having
   an internally axially extending threaded bore,
   an externally threaded telescoping second connector member threaded into the cylindrical connector threaded bore,
   a radially opening axially extending slot formed in said second connector for accommodating a line having a spherical end,
   said slot extending the entire length of said connector and extending through the center thereof,
   a plurality of fragmentary spherical seats formed in the center of said slot and at axially spaced locations in said slot,
   said seats facing towards the first connector for seating the spherical end of said line,
   cylindrical radially extending passages enlarged in said slot leading to each of the seats,
   whereby the line may be tightened and loosened by moving the spherical line end to another fragmentary seat and rotating the second connector relative to the first connector.

4. A turnbuckle mechanism comprising:
   a cylindrical connector member having
   an internally axially extending threaded bore defined by said cylindrical connector,
   an externally threaded telescoping second connector member threaded into the cylindrical connector threaded bore,
   a radially opening axially extending slot formed in said second connector for accommodating a line having a spherical end,
   said slot extending the entire lentgh of said connector and extending through the center thereof,
   a plurality of fragmentary spherical seats formed in the center of said slot and at axially spaced locations in said slot,
   said seats facing towards the cylindrical connector for seating the spherical end of said line, cylindrical radially extending passages enlarged in said slot leading to each of the seats, an enlarged wrench receiving head formed on the end of said second connector extending axially away from said cylindrical connector, said head being used to axially move the second connector relative to the cylindrical connector, whereby the line may be tightened and loosened by moving the spherical line end to another fragmentary seat and rotating the second connector relative to the cylindrical connector.

References Cited in the file of this patent

UNITED STATES PATENTS

| | | |
|---|---|---|
| 1,132,348 | Hunter | Mar. 16, 1915 |
| 1,845,123 | Buhr | Feb. 16, 1932 |
| 2,305,234 | Bratz | Dec. 15, 1942 |
| 2,738,998 | Haupt | Mar. 20, 1956 |